United States Patent [19]

Dehon et al.

[11] Patent Number: 4,649,020
[45] Date of Patent: Mar. 10, 1987

[54] NUCLEAR FUEL ASSEMBLY AND NUCLEAR REACTOR OPERATING PROCESS COMPRISING APPLICATION THEREOF

[75] Inventors: Claude Dehon, Oullins; André Kolmayer, Lyons, both of France

[73] Assignee: Fragema, Courbevoie, France

[21] Appl. No.: 704,221

[22] Filed: Feb. 22, 1985

[30] Foreign Application Priority Data

Feb. 22, 1984 [FR] France ................................ 84 02684

[51] Int. Cl.$^4$ ............................................... G21C 3/00
[52] U.S. Cl. .................................. 376/419; 376/447; 376/449
[58] Field of Search ................ 376/419, 434, 447, 449

[56] References Cited

U.S. PATENT DOCUMENTS 4,155,808  5/1979  Jabsen .................................. 376/447

FOREIGN PATENT DOCUMENTS 221695  12/1984  Japan .................................. 376/419
1084463  9/1967  United Kingdom .

Primary Examiner—Deborah L. Kyle
Assistant Examiner—Richard W. Wendtland
Attorney, Agent, or Firm—Pollock, Vande Sande & Priddy

[57] ABSTRACT

The nuclear fuel assembly comprises a bundle of fuel elements some of which contain a burnable neutronic poison, held in position at the nodes of a regular lattice by a skeleton having end pieces connected together by guide tubes occupying some of the nodes of the lattice. All the poison-containing elements are disposed so as to act on the reactivity of the adjacent assemblies in the heart of the reactor.

9 Claims, 6 Drawing Figures

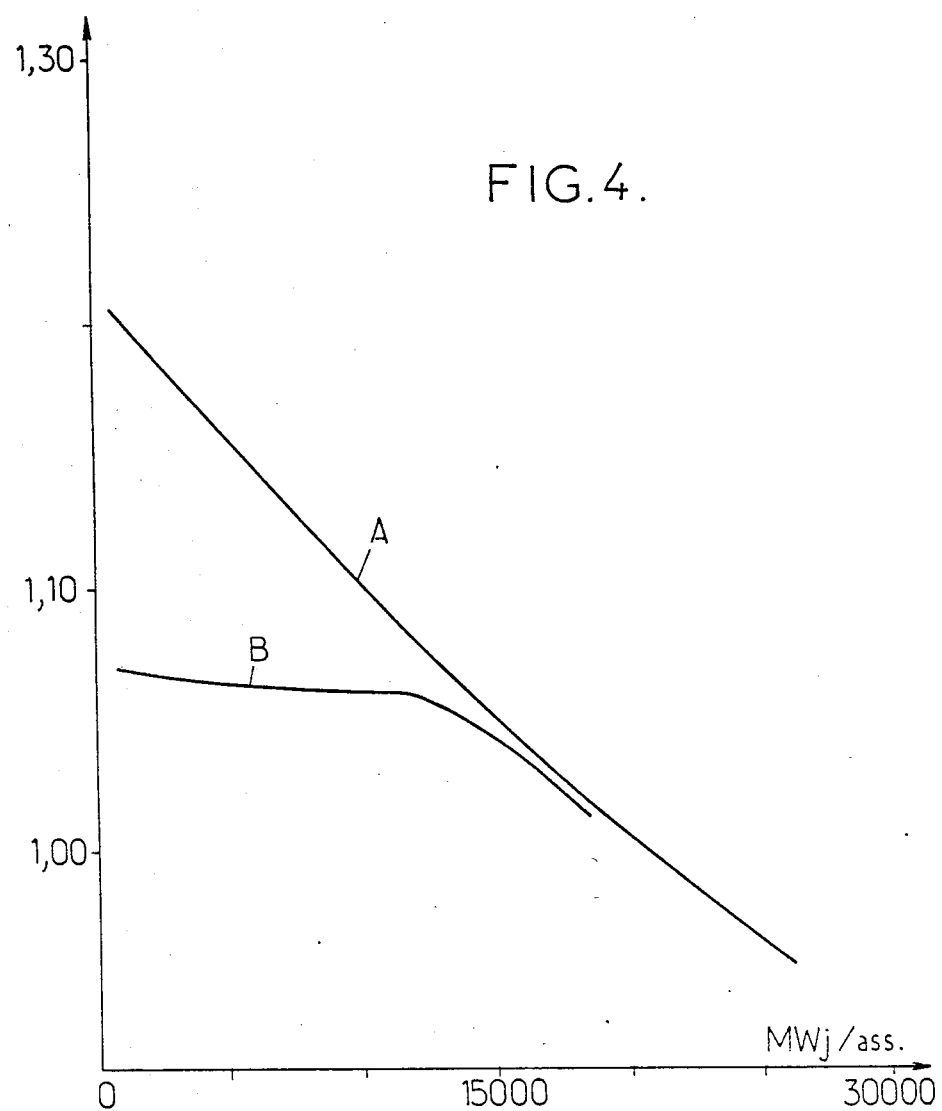

NUCLEAR FUEL ASSEMBLY AND NUCLEAR REACTOR OPERATING PROCESS COMPRISING APPLICATION THEREOF

The invention relates to nuclear fuel assemblies comprising a bundle of fuel elements some of which contain a burnable neutronic poison, held in position at the nodes of a regular lattice by a skeleton having end pieces connected by guide tubes occupying some of the nodes of the lattice.

Such fuel assemblies have been used for a long time for constituting the first fissile material charge placed in a nuclear reactor (French No. 1 503 127 and 1 504 651). The role of the consumable neutronic poison, formed by the material having a large effective neutron capturing section and not producing highly absorbing isotopes, is to reduce the initial reactivity of the core during start up of the fission process. The presence of poison allows larger fissile material charges to be used, which increase the duration of the first operating cycle of the core, at the end of which it is necessary to replace part of the assemblies by new assemblies and to change the arrangement of the remaining assemblies. Its aim is also to allow the power distribution in the whole of the core to be made uniform by appropriate distribution, in the core, of assemblies containing poison. Among the poisons used may be mentioned boron, samarium, europium and especially gadolinium, frequently in the form of a compound such as an oxide. As a general rule, those fuel elements which contain consumable poison have up to now been disposed so as to homogenize the distribution of the anti-reactivity which they represent within the assembly. That leads to spacing them away from the edges of the assembly and, often, in making them adjacent the guide tubes, frequently arranged to receive a cluster of mobile absorbing material elements belonging to a control bar.

It seems that prior to the present invention, there was no awareness of the drawbacks of this approach consisting in using, solely for the first charge of the reactor, assemblies comprising a poison distributed so as to homogenize the antireactivity distribution in the assembly taken separately.

A first disadvantage is that this distribution leads to an imbalance in the radical distribution of the neutron power appearing in the core. A second disadvantage is related to abandoning the use of poison from the second operating cycle. It is known that, after the first cycle, the assemblies forming the central part of the core are removed (one third of the assemblies typically), the assemblies forming the intermediate and peripheral parts of the core are moved respectively to the central and intermediate zones and the freed peripheral part is equipped with new fuel assemblies. The overall reactivity balance of the new core is obviously much lower than that of an entirely new core and consequently makes the addition of consumable poison unnecessary.

On the other hand, this lesser reactivity of the new core, because only one third of the core has been replaced, detrimentally affects operation of the reactor, because the cycles are shortened and moves the operating cycle away from the optimum from the point of view of combustion of the fissile material and of the volume of fuel to be reprocessed.

Lengthening the cycle durations beyond the first one by increasing the enrichment of the fuel elements or by increasing the number of new assemblies at each reloading has already been thought of. But then the initial excess of reactivity must be compensated by a corresponding increase of the boron content of the coolant, which has the double disadvantage of reducing the safety (by reducing the value of the negative temperature coefficient of the moderator during operation) and increasing the volume of the effluents to be treated.

It is an object of the invention to reduce the overall reactivity imbalance of the core resulting from replacement of part of the fuel, particularly by improving the power distribution where new assemblies and assemblies having undergone one cycle are adjacent each other. To this end, there is provided an assembly of the above defined kind in which all fuel elements containing neutronic poison are disposed so as to act on the reactivity of the adjacent assemblies in the core of the reactor.

The adoption of such an assembly permits a more complete burn-up of the fissile material of the assemblies if it is decided to keep the same duration of an elementary cycle time as in the past: it is then sufficient to constitute the central part of the core with assemblies having undergone one cycle and with new assemblies in accordance with the invention. The burnable poison-containing fuel elements of the latter not only affect the assemblies which contain them, but also adjacent poison free assemblies, thus avoiding any excessive power imbalance.

However, a preferred approach consists of lengthening the elementary cycle time, since the frequency of shut downs of the generating plant and the doses received by the personnel may be reduced.

The fuel material in fuel assemblies intended for use of "long" cycles will generally have a higher fissile isotope enrichment than the assemblies used up to now and also a higher poison rate.

Gadolinium in the form of oxide $Gd_2O_3$ may typically be used as a burnable neutronic poison. Gadolinium oxide has the advantage of forming, with uranium dioxide powder, a ceramic which may be formed by cold mixing and sintering and does not increase the difficulty of reprocessing the fuel which contains it.

On the other hand, in the assemblies used up to the present, it was felt that the very high absorption and very rapid anti-reactivity variation kinetics of gadolinium was a disadvantage since it causes a fast and substantial evolution of the power distribution in the core, causing local power peaks, which limit the overall extractable power. This disadvantage is overcome in the case of the invention because the antireactivity of the poison containing elements affects not only those assemblies which contain the poison containing fuel elements but also the adjacent fuel assemblies.

Although the solution consisting in incorporating the burnable neutronic poison in the nuclear fuel pellets is of particular interest, it is not exclusive. The poison may be incorporated in fuel elements as a coating or as mechanically connected sleeves (French No. 2 520 916).

A convenient solution consists in locating the elements containing poison at the nodes of the lattice which are the furthest away from those occupied by the guide tubes (which define water paths when the control rods are withdrawn, and which then constitute paths which are strongly cooled and in which there is no generation of energy either by fission or by absorption of the gamma radiation coming from the poison). In these fuel assemblies which are of frequent use and have a large number of nodes (typically of square lattice with 17×17 nodes), the poison containing elements may be placed so that the axis of each of these elements is separated from each guide tube forming a water stream by more than two pitches (elementary spacing) of the lattice. Often, the most advantageous solution will consist in placing the poison containing elements at the periphery of the lattice, whereas the guide tubes are placed at nodes separated by at least two elementary internode spacings from the nodes which are situated at the periphery.

The invention will be better understood from the following description of particular embodiments of the invention given by way of examples only and from the comparison thereof with the prior art.

SHORT DESCRIPTION OF THE DRAWINGS

FIGS. 1a, 1b and 1c are schematical cross-sectional views along a plane transverse to the flow direction of the coolant, showing the distribution of the guide tubes and poison-containing elements in one half of three fuel assemblies according to the prior art;

FIG. 2, similar to FIGS. 1a, 1b and 1c, shows a distribution of the guide tubes and of the poison containing elements in a fuel assembly according to an embodiment of the invention;

FIG. 3 is a diagram illustrating curves representative of the value of the radial power peak (ratio between the power supplied by the hottest element and the average power per fuel element in the assembly) vs. fuel burn up, expressed in MWd per assembly, for the assembly of FIG. 2 (curve 2) and the asemblies of FIGS. 1a-1c (curves 1a, 1b, 1c), the assembly occupying a representative position in the core;

FIG. 4 shows the variation of the reactivity of an assembly without burnable poison (curve A) and that of an assembly containing burnable poison (curve B) as a function of fuel burn-up, again in MWd per assembly.

DETAILED DESCRIPTION OF PREFERRED EMBODIMENTS

Figure 1A:
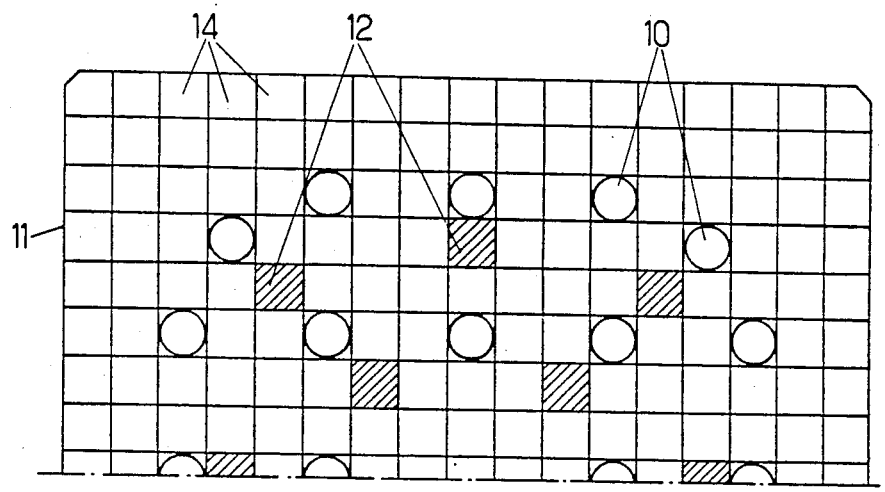
Figure 1B:
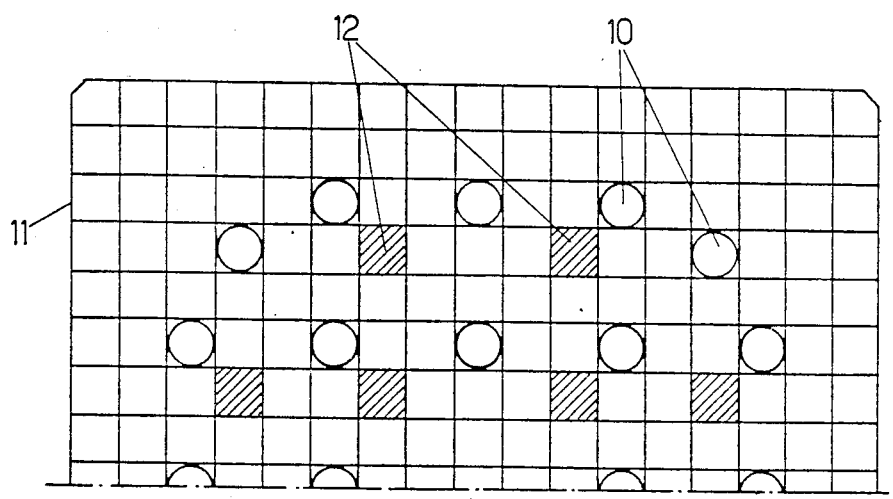
Figure 1C:
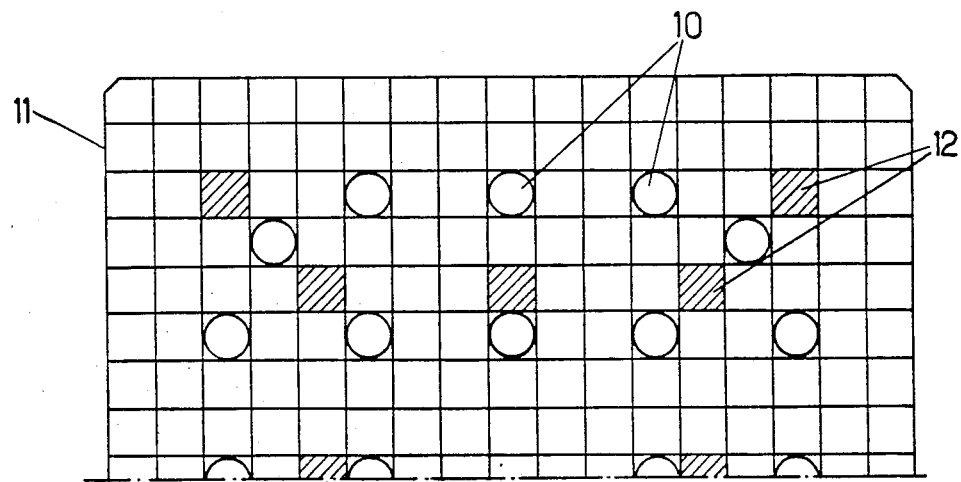
Figure 2:
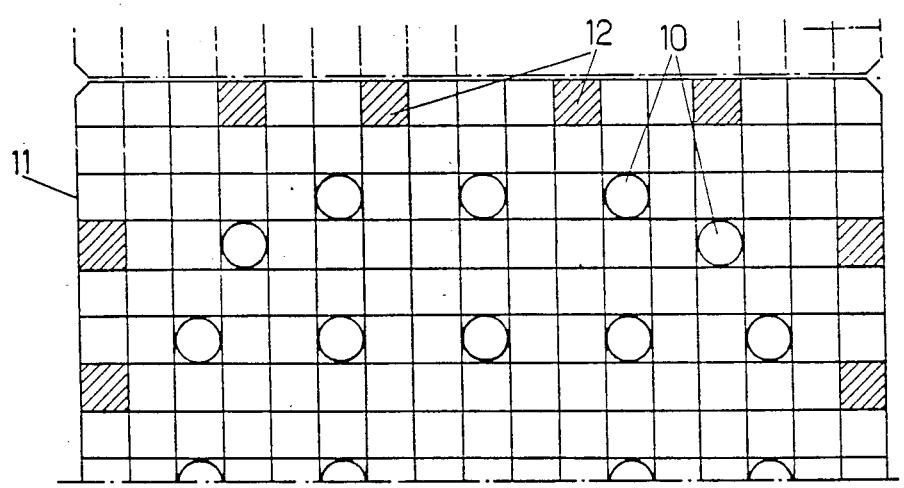

Referring to FIGS. 1a, 1b, 1c and 2, fuel assemblies of generally conventional construction comprise two end pieces (not shown) connected together by guide tubes 10 forming water paths when they do not contain neutron absorption or inert rods. The guide may be arranged so that a cluster of neutron absorbing rods belonging to a control bar of the reactor may be moved as a whole along them. The guide tubes are disposed at some of the nodes of a regular lattice, with square mesh in the case illustrated, and are placed in the lattice so as to ensure homogeneous distribution of neutron absorption. The lattice may be defined by grids 11, one of which is shown in FIGS. 1a-2, formed from mutually assembled strips. The grids 11, which form a structural skeleton with the guide tubes and the end pieces, define passages 14 receiving fuel elements. Those of the passages which receive fuel elements 12 also containing neutronic poison are shown with hatching in FIGS. 1a, 1b, 1c and 2.

FIGS. 1a, 1b and 1c show three arrangements of elements containing neutronic poison which are conventionally used in assemblies having 17×17 passages and twenty four guide tubes 10. The poison containing elements 12 are placed in passages adjacent the guide tubes 10, resulting in radial imbalance of the neutron power.

On the other hand, in the assembly following a particular embodiment of the invention, which is shown in FIG. 2, the poison containing elements 12 are placed in peripheral passages, i.e. at peripheral nodes of the lattice so as to be the furthest possible away:

from the highest temperature zone of the assembly, generally formed by the zone occupied by the fissile elements in the central part, where the power is highest, from the water flows defined by guide tubes 10 when the latter contain neither absorbing elements belonging to a control bar, nor plugs.

It can be seen that the axis of each of the poison containing elements 12 is spaced apart by at least two elementary node spacings from the axis of the nearest guide tube 10. Thus the number of elements containing fissile material only (i.e. devoid of poison) which are subjected both to the immediate vicinity of a guide tube 10 and that of a poison containing element 12 is considerably reduced. It will be further appreciated that when the adjacent assemblies (a fraction of one of such assemblies being shown in broken line in FIG. 2) do not contain poison, the position of the poison containing elements 12 corresponds to an optimized configuration of the antireactivity distribution among neighbouring assemblies.

When the assembly is for use in a core provided so that adjacent assemblies all contain elements containing poison, the cumulative antireactivity effect of two elements 12 which are adjacent each other is selected so that the power increase, in the immediately adjacent elements (due to the absorption by these elements of the gamma rays coming from elements 12), does not exceed the set limits for such poison free fuel elements.

Figure 3:
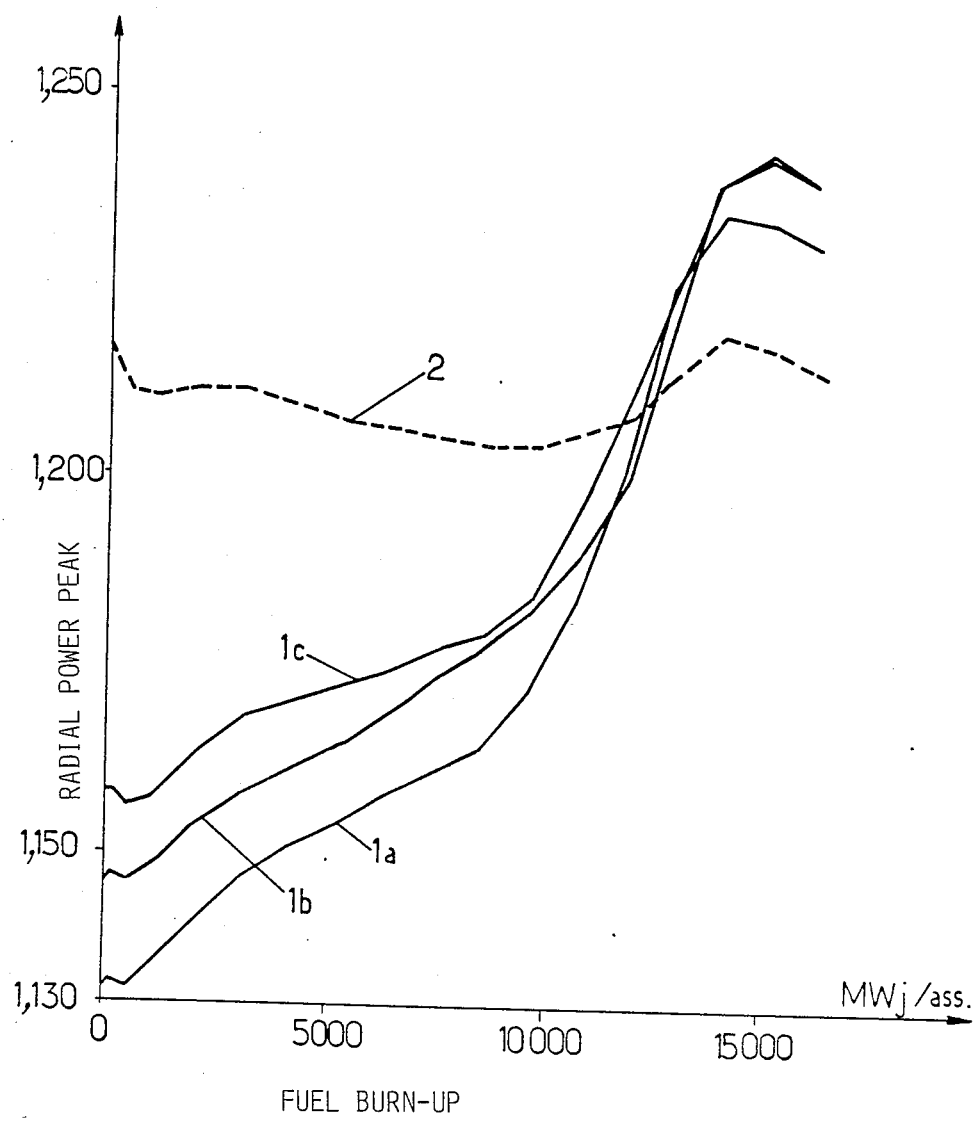

The favorable effect of implementing the invention appears in FIG. 3. When elements 12 containing neutronic poison are placed at the periphery of the assembly, as is illustrated in FIG. 2, the radial power peak (ratio between the power delivered by the most loaded fuel element and the average power per element in the assembly) is substantially constant during the whole lifetime of the assembly. On the other hand, in assemblies shown in FIGS. 1a, 1b and 1c, the peak varies considerably; while it is low at the beginning of the life of the assembly, it becomes appreciably greater than that found in the case of the assembly of FIG. 2 when the poison is burnt.

Thus, progressive elimination of the burnable neutron poison and the local reduction of absorption which results therefrom do not detrimentally affect the core of the reactor by an excessive increase of the radial power peak at the end of life and does not impose thereon any important transient throughout the cycle.

The example shown in FIG. 3 corresponds to assemblies whose fuel elements contain pellets of uranium dioxide having a 3.25% U235 content, whereas elements 12 contain pellets with lower U235 enrichment, having 8% by weight of $Gd_2O_3$. These proportions are not essential; the $Gd_2O_3$ content may be varied, up to about 15%.

The effect of the presence of poison containing elements on the overall reactivity of an assembly appears in FIG. 4. An assembly comprising 16 gadolinium containing elements, with the arrangement shown in FIG. 2, has a reactivity which hardly changes during the initial phase of the cycle (curve B). Its reactivity then approaches that of an assembly without poison containing elements (curve A).

The fact that the poison containing assemblies will have an influence on the adjacent assemblies may be used in several ways.

It is possible to maintain a normal cycle time (life duration), that is to say of about one year, because it will allow the burn-up of the fuel assemblies placed in the central region of the core to be increased by inserting, among these assemblies, new assemblies containing poison in accordance with an arrangement of the invention. In fact, this alternation of assemblies will not cause an appreciable imbalance, for the effect of the poison containing elements of an assembly will extend to the adjacent assemblies.

The invention may also be used, with advantage, with an extended combustion cycle by adopting a higher isotopic enrichment rate in the fuel assemblies, the additional reactivity thus produced by the new assemblies being compensated by the presence of poison.

We claim:

1. A nuclear fuel assembly comprising a bundle of fuel elements some of which contain burnable neutronic poison and a structure for retaining said fuel elements at the nodes of a regular lattice, said structure having end pieces connected together by guide tubes occupying some of the nodes of the lattice, wherein all of said poison-containing elements are so located as to affect the reactivity of adjacent fuel assemblies when located in the core of a reactor and wherein the poison-containing elements are disposed at the nodes of the lattice furthest away from said guide tubes.

2. Assembly according to claim 1, wherein the axis of each of said poison-containing elements is separated from the axis of the nearest guide tube forming a water stream by more than one elementary spacing of the lattice.

3. Assembly according to claim 1, wherein all of said poison-containing elements are distributed at nodes located at the periphery of the lattice, whereas said guide tubes are distributed at nodes separated by at least two elementary spacing of the lattice from the nodes situated at the periphery of the lattice.

4. Assembly according to claim 1, wherein the burnable neutronic poison is gadolinium.

5. Assembly according to claim 4, wherein said neutronic poison containing fuel elements comprise uranium dioxide pellets with a $Gd_2O_3$ content of up to 15%.

6. Assembly according to claim 5, wherein the $Gd_2O_3$ content is about 8% in weight.

7. A nuclear fuel assembly for a light water cooled and moderated reactor, comprising a bundle of $17 \times 17$ fuel elements maintained parallel to each other and at the nodes of a square array by a supporting structure including guide tubes for movable neutron absorbing rods located at a plurality of said nodes of said array all of which are separated from a peripheral row of said array by at least one intermediate node, wherein a plurality of said fuel elements contain burnable poison and are all located in peripheral rows and mutually separated by at least two fuel elements devoid of poison.

8. A process for operating a nuclear reactor comprising a core formed by a plurality of mutually adjacent fuel assemblies in upright position, wherein the whole core of the reactor is initially loaded with new fuel assemblies containing burnable neutronic poison and, at the end of the first cycle, part of the fuel assemblies are removed from the center of the reactor and the assemblies situated at the periphery are moved towards the center, wherein fresh fuel assemblies are then placed at the peripheral part of the core, each comprising a bundle of fuel elements some of which contain burnable neutronic poison and a structure for retaining said fuel elements at the nodes of a regular lattice, said structure having end pieces connected together by guide tubes occupying some of the nodes of the lattice, wherein all of said poison-containing elements are so located as to affect the reactivity of adjacent fuel assemblies when located in the core of a reactor and wherein the poison-containing elements are disposed at the nodes of the lattice furthest away from said guide tubes.

9. A process according to claim 8, wherein additional fresh fuel assemblies are placed among the assemblies brought to the central part of the core.

* * * * *